United States Patent [19]

Herrenschmidt et al.

[11] Patent Number: 5,512,166
[45] Date of Patent: Apr. 30, 1996

[54] PROCESS AND APPARATUS FOR THE CONTINUOUS REPLACEMENT OF THE CATALYST IN A MOVING-BED UNIT

[75] Inventors: Patrice Herrenschmidt, le Pecq; François-Xavier Cormerais; Thierry Patureaux, both of Fontaine la Mallet, all of France

[73] Assignee: Total Raffinage Distribution, S.A., Levallois-Perret, France

[21] Appl. No.: 911,924

[22] Filed: Jul. 10, 1992

[30] Foreign Application Priority Data

Jul. 10, 1991 [FR] France ................... 91 08680

[51] Int. Cl.⁶ .................................................. C10G 35/12
[52] U.S. Cl. ........................ 208/152; 208/146; 208/147; 208/176; 208/134; 208/58; 208/59; 208/62; 208/89; 208/92
[58] Field of Search ..................... 208/161, 152, 208/173, 176, 14, 147, 152, 134, 176, 58, 59, 62, 89, 92, 146

[56] References Cited

U.S. PATENT DOCUMENTS

| | | | |
|---|---|---|---|
| 2,596,748 | 5/1952 | Watson et al. | 208/161 |
| 2,851,402 | 9/1958 | Haddad | 208/173 |
| 2,880,170 | 3/1959 | Savoca et al. | 208/173 |
| 2,882,912 | 4/1959 | Reeg et al. | 208/173 |
| 2,886,210 | 5/1959 | Cooper et al. | 208/173 |
| 3,470,090 | 9/1969 | Carson | 208/176 |
| 3,547,809 | 12/1970 | Ehrlich et al. | 208/176 |
| 3,850,582 | 11/1974 | Luckenbach | 208/152 |
| 3,873,441 | 3/1975 | Jones | 208/173 |
| 4,744,887 | 5/1988 | Van Driesen et al. | 208/176 |
| 4,875,995 | 10/1989 | Van Driesen et al. | 208/176 |
| 5,021,147 | 6/1991 | Van Driesen | 208/176 |
| 5,076,908 | 12/1991 | Strangeland | 208/173 |
| 5,081,039 | 1/1992 | Bullke et al. | 208/143 |
| 5,190,638 | 3/1993 | Swan, III | 208/63 |
| 5,190,639 | 3/1993 | Swart et al. | 208/63 |

FOREIGN PATENT DOCUMENTS 0308027  9/1987  European Pat. Off. .......... C10J 3/50

*Primary Examiner*—Helane Myers
*Attorney, Agent, or Firm*—A. Thomas S. Safford

[57] ABSTRACT

A process for the simultaneous replacement of a first catalyst by a second catalyst which first catalyst is circulating as a moving bed of solid particles in a hydrocarbon treating unit, which unit comprises at least one processing reactor. The first catalyst is withdrawn downstream of the reactor, or of each reactor, in the direction of catalyst circulation. The second catalyst is simultaneously injected upstream of the reactor or of each reactor. The bulk density of the material withdrawn downstream of the reactor, or of each reactor, is measured continuously. The withdrawal of the first catalyst and the injection of the second catalyst into the reactor concerned are interrupted when the bulk density so measured is equal to that of the second catalyst.

14 Claims, 3 Drawing Sheets

5,512,166

PROCESS AND APPARATUS FOR THE CONTINUOUS REPLACEMENT OF THE CATALYST IN A MOVING-BED UNIT

RELATED APPLICATIONS

This application claims the benefit of priority under 35 U.S.C. §119 from French Application No. 91 086 80, filed Jul. 10, 1991, which is hereby incorporated herein by reference.

FIELD OF THE INVENTION

The present invention relates to a process and an apparatus for the replacement by a second catalyst of a first catalyst of a moving-bed reactor in a hydrocarbon treating unit. More particularly, the invention relates to a process of this type which can be placed into operation without interruption of the process and without shutting down the hydrocarbon treating unit.

BACKGROUND OF THE INVENTION

It is known that in a great many hydrocarbon treating processes, such as reforming, cracking, isomerization, hydrotreatment of residues, etc., the hydrocarbon feedstock is converted by being contacted with catalyst particles in a reactor. Most of the treating units are fixed-bed units. (See "Catalytic Reforming", by Donald M. Little, PennWell Books.)

In the course of the catalytic reaction, coke and various hydrocarbon products deposit on the particles and deactivate them. The catalyst particles must then be regenerated by means of a stream of carrier gas which generally contains oxygen to provide for the combustion of the coke and of the other products deposited on the catalyst.

This operation may be performed in situ or ex situ, with the unit shut down.

The advantage of continuous regeneration processes, known as moving-bed processes, is that the production unit need not be shut down and the spent catalyst can be regenerated by withdrawing it downstream of the reactor and, after a regenerating treatment, reinjected into an ad hoc zone connected with the reactor.

However, even with units of the regenerative type, the catalyst is gradually deactivated. It is therefore advisable to replace the spent catalyst periodically with fresh catalyst.

It is during the replacement of this catalyst (hereinafter called the first catalyst) with fresh catalyst (hereinafter referred to as the second catalyst), which may be either of the same type or of a different type from the first catalyst, that difficulties arise in continuous operation when attempting to avoid interruption in production by the hydrocarbon treating unit.

In particular, it is difficult to know just when to stop introducing the second catalyst, so that the first catalyst is definitely completely discharged and so that no excess of second catalyst is introduced upstream of the reactor. This difficulty is due in part to the mixing of the two catalysts which occurs particularly along the walls of the reactor.

In fact, since there is no means to accurately measure the quantities of catalyst to be withdrawn and amount of catalyst to be introduced, it is customary to overcompensate and feed into the reactor a quantity of fresh catalyst that is much greater than what is normally required. This results in a higher cost of the catalyst feed, a corresponding loss of a portion of the fresh catalyst that will be reprocessed as if it had been deactivated, and an increase in the duration of the replacement phase, which imposes an economic penalty on production.

Moreover, when a unit with several parallel reactors is used which reactions are individually connected to a single regenerator and which can be in continuous use, simultaneously, the replacement of the catalyst is very difficult to carry out with the desired synchronicity. For example, the replacement operations may be terminated in one of the reactors while still in progress in the other reactors. The safety margin then becomes prohibitively expensive for the refiner. Also, the mixture of old and new catalyst particles may be very heterogeneous, especially along the reactor walls.

OBJECTS OF THE INVENTION

The invention seeks to remedy these drawbacks of prior methods of catalyst replacement.

An object of the invention thus is to provide a process for the continuous replacement of the catalyst in a moving-bed unit of the type described above which replacement process does not require the unit to be shut down.

Another object of the invention is to provide a process of this type which makes it possible to introduce precisely into the unit only the desired quantity of replacement catalyst.

The invention further provides a process of this type which permits the simultaneous and synchronized replacement of the catalyst in several parallel reactors in a given treatment unit.

Still another object of the invention is to provide a process which can readily be placed into service in existing continuous hydrocarbon treating units, particularly in catalytic reforming units of the regenerative type, or in hydrotreating units for vacuum distillation residues.

The invention further provides a simple, rapid and low-cost means for placing such a process into service.

To this end, the invention has as a preferred embodiment a process for the replacement by a second catalyst of a first catalyst in the solid state which circulates in a hydrocarbon treating unit, the unit comprising at least one treating reactor in which the catalyst is present in a moving bed.

The process is characterized in that the first catalyst is withdrawn downstream of the reactor, or of each reactor, in the direction of catalyst circulation.

The process is further characterized in that the second catalyst is simultaneously injected upstream of the reactor, or of each reactor, at a volume flow rate that is at most equal to the volume flow rate of withdrawal of the first catalyst. The introduction of the second catalyst may be preceded by the injection of a quantity of a third solid substance of a different bulk density to serve as a marker in the event that the first and second catalysts have substantially the same bulk density. The bulk density of the material withdrawn downstream of the reactor, or of each reactor, is measured continuously, and the withdrawal of the first catalyst and the injection of the second catalyst into the reactor are interrupted when the bulk density so measured is equal to that of the second catalyst.

If the bulk density of the catalyst withdrawn downstream of the reactor is equal to that of the second catalyst, this obviously means that substantially all of the first catalyst in circulation that is to be replaced has been withdrawn from the circuit, along with all of the third solid substance, if any, serving merely as a marker between the first and second catalysts.

In the event that the first and second catalysts have substantially the same bulk density, the third solid substance injected ahead of the second catalyst upstream of the reactor serves merely as a marker indicating that substantially the entire quantity of the first catalyst has in fact been withdrawn. The quantity of third solid substance used may therefore be very small and generally ranges from 1 to 2 percent by weight of the quantity of catalyst to be replaced.

If the second catalyst has a bulk density that differs from that of the first catalyst by at least 1 percent, and preferably by from 2.5 to 25 percent, and the bulk densities measured as a function of time are recorded continuously or intermittently on a graph, there is first noted a straight-line portion which corresponds to the density of the first catalyst, which straight line portion runs parallel to the axes of the abscissas. Next, a sloping curved portion is noted, which curved portion represents the gradual replacement of the first catalyst. This portion runs to a second straight line which corresponds to the bulk density of the second catalyst and which signifies a withdrawal of the second catalyst alone at the point of withdrawal.

If, on the other hand, the bulk densities of the two catalysts are close to each other, it is necessary to use a third substance of a significantly different bulk density to serve as a marker to distinguish between the two catalysts at the level of the point of withdrawal. The graph representing the variations in density as a function of time then comprises a portion parallel to the axes of the abscissas which corresponds to the bulk density of the first catalyst withdrawn, then a peak which corresponds to the withdrawal of the third solid substance, and finally a straight portion parallel to the axis of the abscissas, which corresponds to the bulk density of the second catalyst and reflecting the only withdrawal thereof.

In the event that a third solid substance is employed, the dimensions of the particles of that substance must, of course, be substantially equal to those of the catalysts so that the system of the circulating device is not upset.

When the hydrocarbon treating unit comprises several reactors in parallel in which the catalyst used is to be replaced simultaneously, it is desirable to provide for the synchronism of the withdrawal and loading operations of the reactors so that they are completed at the same time for the whole of the reactors. To this end, the bulk densities of the materials withdrawn simultaneously downstream of each reactor are compared continuously or intermittently and the second-catalyst feed rate of these reactors and the first-catalyst withdrawal rate are adjusted so as to maintain the bulk densities measured substantially equal.

A further embodiment of the invention is an apparatus for the replacement by a second catalyst of a first catalyst circulating in a hydrocarbon treating unit comprising at least one reactor in which the catalyst is present as a moving bed, said apparatus comprising, downstream of the reactor in the direction of catalyst circulation, a means for withdrawal of the first catalyst, and, upstream of the reactor, a means for injection of the second catalyst or of a third solid substance, said apparatus being characterized in that it comprises a means for measuring the bulk density of the material withdrawn by the withdrawal means.

The means for measuring the bulk density of the material withdrawn advantageously comprises means for recording in the form of a graph the evolution of that density as a function of time.

In the event that the hydrocarbon treating unit comprises several reactors in parallel in which the catalyst used is to be replaced simultaneously, the apparatus of the invention preferably comprises a means for comparing the bulk densities of the materials withdrawn downstream of each reactor and means for controlling the feed rate of replacement catalyst to each of the reactors and the rate of withdrawal of catalyst to be replaced, these control means being under the control of the comparing means so as to maintain the measured bulk densities of the materials withdrawn substantially equal.

It should be noted that the process of the invention is also applicable to hydrotreating units for vacuum distillation residues. In such units, the catalyst continuously circulates slowly from the top to the bottom of the reactor, spent catalyst being withdrawn downstream of the reactor and fresh catalyst being simultaneously added upstream thereof. The speed of circulation of the catalyst is slow and is a function of the desired level of catalytic activity as well as of the level of catalyst poisoning, particularly by metals of the nickel and vanadium type.

In this type of process, the catalyst is not continuously regenerated in the same unit, but the process of the invention makes it possible to resolve the problems which arise when on the occasion of a drop in catalyst activity it is necessary to replace all of the catalyst bed rapidly without stopping production and discharging during the shutdown the entire catalyst bed and then putting the unit back on stream.

BRIEF DESCRIPTION OF THE DRAWINGS

In this specification and in the accompanying drawings, we have shown and described preferred embodiments of the invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION

Figure 1:
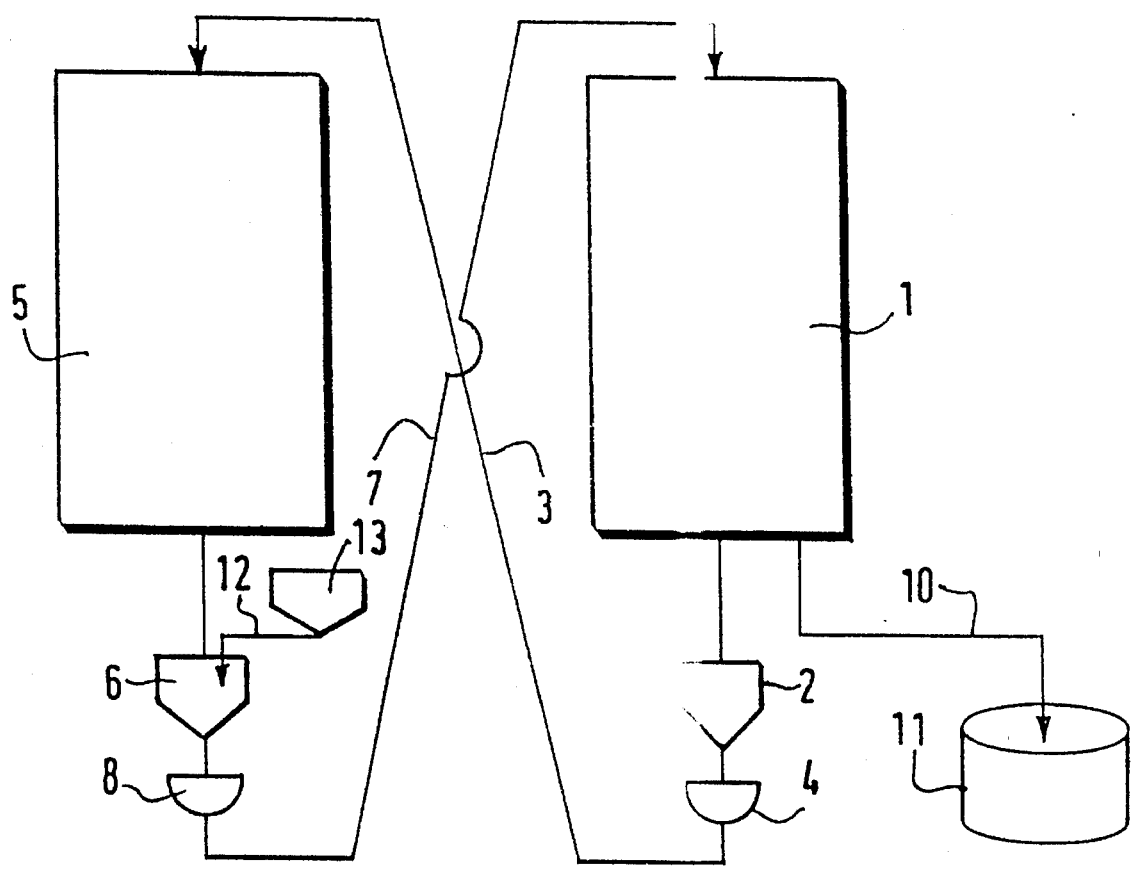
FIG. 1 is a flowsheet illustrating the catalyst circulation circuit in a hydrocarbon treating unit which comprises a single reactor and a single regenerator and is equipped with an apparatus for replacement of the catalyst in accordance with the invention.

The catalyst circulation circuit shown in FIG. 1 comprises a single hydrocarbon-treating reactor 1 containing a catalyst in a moving bed. The intake lines for the feedstock to be treated and for the hydrogen and the discharge lines for the products of the conversion are not shown. The deactivated catalyst, covered with a deposit of coke and of hydrocarbon products, is discharged by gravity at the base of the reactor 1 into a surge hopper 2, from where it is transferred through the line 3, suspended in a carrier gas coming from the compressor 4, to the upper part of a regenerator 5. At the base of that regenerator, air or oxygen is injected through a line which is not shown, and the products deposited on the active sites of the catalyst are thus removed by combustion. At the base of the regenerator 5, the regenerated catalyst is discharged by gravity into a surge hopper 6, from where it is recycled through the line 7, suspended in a carrier gas coming from the compressor 8, to the upper part of the reactor 1.

For more information on such catalyst circulation circuits in plants for the catalytic reforming of hydrocarbon feedstocks, the aforesaid book, "Catalytic Reforming", by Donald M. Little, PennWell Books, pages 153 ff, is referred to, and for the moving-bed concept, the work by S. Trambouze, H. Van Landeghem and J-P Wauquier, "Les Réacteurs Chimiques", pages 10, 398–400 and 432–446.

When it is desired to replace the catalyst circulating in the circuit described above with a second catalyst of a different bulk density in accordance with the present invention, the spent catalyst to be replaced, that is, the first catalyst, is continuously withdrawn at the base of the reactor 1 or of the regenerator, without interruption of the operation of the production unit, and discharged through the line 10 to a storage unit 11 while the replacement catalyst, or second catalyst, is simultaneously introduced through the line 12 at the upper part of the reactor 1 or, at the outlet of the regenerator, from a hopper 13.

Figure 2:
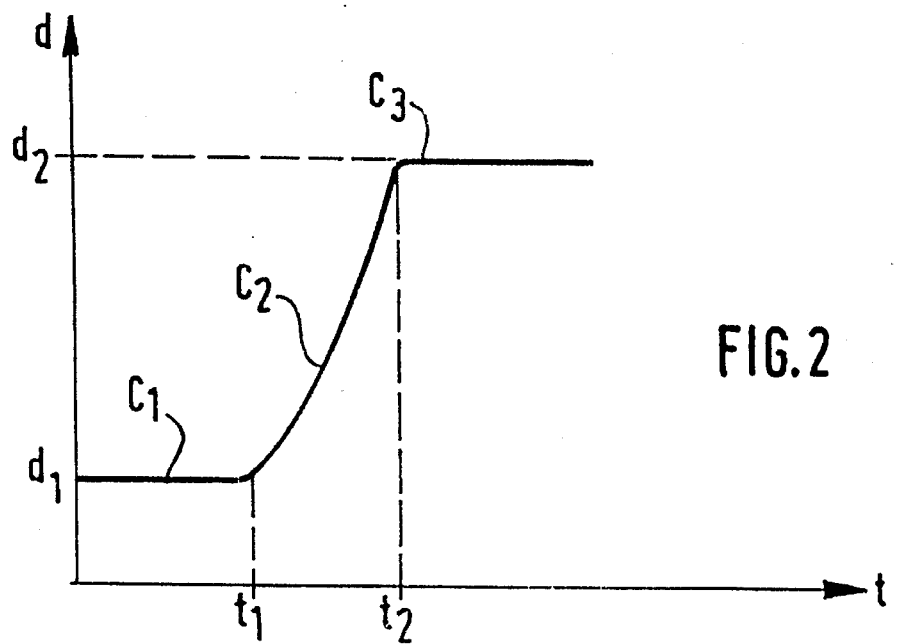
FIGS. 2 and 3 are diagrams illustrating the variation as a function of time $t$ of the bulk density $d$ of the material withdrawn downstream of the reactor in the event that the catalyst to be replaced and the replacement catalyst have significantly different bulk densities and in the event that these bulk densities are close together and a third solid substance is employed, respectively.

The bulk density of the catalyst withdrawn through the line 10 is measured continuously or intermittently, and this bulk density $d$ is plotted against time $t$ in a graph such as that of FIG. 2, which relates to the case where the first catalyst that is to be replaced has a bulk density lower than that of the second catalyst, or replacement catalyst.

As is apparent from FIG. 2, the portion $C_1$ of the curve that is recorded first is substantially parallel to the axis of the abscissas, which signifies that the bulk density $d_1$ of the catalyst withdrawn is constant and corresponds to that of the first catalyst. At the end of a time $t_1$, the bulk density measured begins to increase (portion $C_2$ of the recorded curve), which indicates that the catalyst withdrawn consists of a mixture of the first and second catalysts. The bulk density measured continues to increase up to time $t_2$, when it again becomes constant and equal to the bulk density $d_2$ of the second catalyst (portion $C_3$ of the recorded curve). The second catalyst thus is the only one to be withdrawn, which means that there is practically none of the first catalyst left in the circuit. The operations of withdrawing first catalyst and introducing second catalyst into the reactor can then be terminated.

These operations have hardly disturbed the operation of the treating unit, which has not been shut down at any time, and their duration has been limited to the time absolutely necessary for the replacement of the first catalyst by the appropriate quantity of the second catalyst, measured with precision.

If the first and the second catalyst have closely similar or even identical bulk densities (as will be the case when the first and second catalysts are two lots of the same catalyst), a similar procedure is used. However, it is initiated by introducing into the reactor, through line 12, before the second catalyst a third solid substance of a bulk density differing significantly from that of the first and second catalysts (exceeding those in the case represented in FIG. 3), which serves as a marker.

Figure 3:
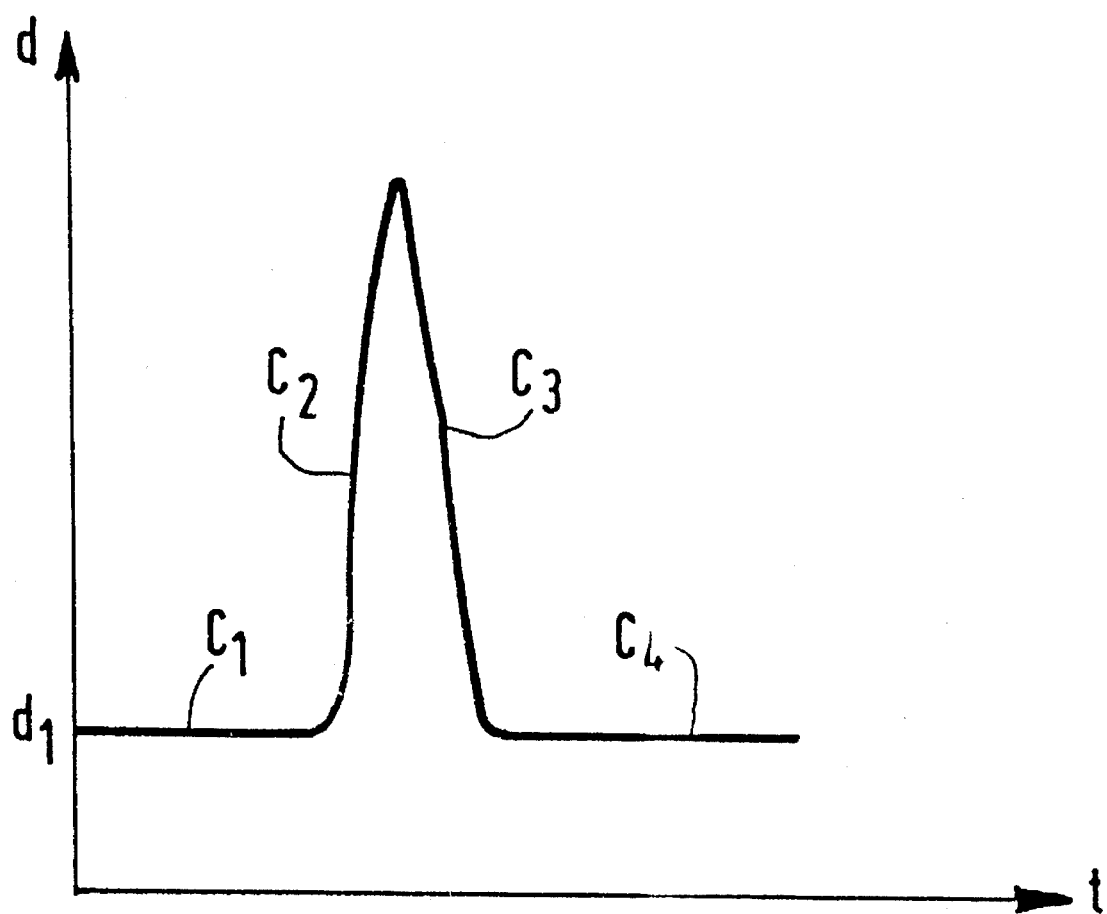

In this case, as is apparent from FIG. 3, curve portion $C_1$, recorded first, will be substantially parallel to the axis of the abscissas and corresponds to the bulk density $d_1$ of the first catalyst. This curve portion $C_1$ is followed by a peak whose ascending portion $C_2$ represents the withdrawal of a mixture of the first catalyst and of the third solid substance while the descending portion $C_3$ corresponds to the withdrawal of a mixture of the third solid substance and of the second catalyst. Curve portion $C_4$ which follows is substantially parallel to the axis of the abscissas, is located in the extension of curve portion $C_1$ and reflects the withdrawal of the second catalyst. As pointed out earlier, the quantity of third solid substance used may be very small, since it serves merely as a marker, and will generally range approximately from 1 to 2 percent by weight of the first catalyst, to be replaced.

Figure 4:
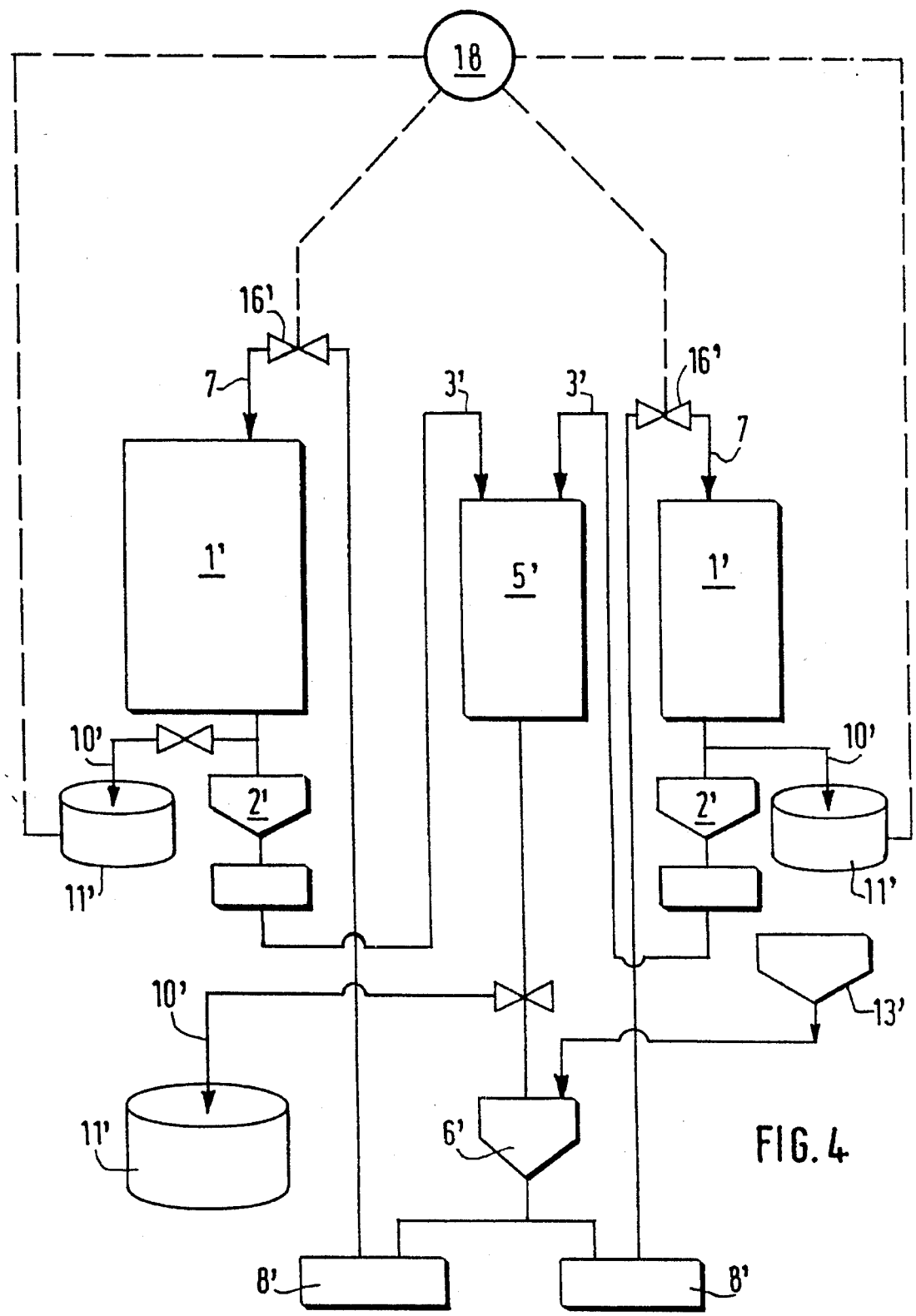
FIG. 4 is a flowsheet similar to that of FIG. 1 for a unit comprising several reactors.

The application of the process of the invention to a hydrocarbon treating unit comprising several reactors is readily available to one skilled in the art, as is apparent from FIG. 4, in which the components already described are designated by the same reference numerals as in FIG. 1 but primed.

In the case of this embodiment, there are two reactors 1'. With a view to synchronizing the loading of the two reactors with fresh catalyst from the hopper 13' as well as the withdrawal from the two reactors through the lines 10", of the catalyst to be replaced, the bulk densities of the materials withdrawn at the base of the two reactors 1' are compared in a comparator 18, which controls valves 16' in the lines 7' supplying the reactors 1' with fresh catalyst so as to regulate the feed rate of these catalysts continuously in such a way that the bulk density of the materials withdrawn at 10', at the base of the two reactors, is substantially the same.

The invention may be further illustrated by the following non-limiting examples, many apparent variations of which are possible without departing from the spirit thereof.

EXAMPLE 1

In this example, the hydrocarbon treating unit is a catalytic reforming unit of the regenerative type, with two reactors and a regenerator, similar to the unit of FIG. 4.

During the phase of continuous replacement of the first catalyst of this unit by a second catalyst of a bulk density exceeding that of the first catalyst, the catalyst is removed at 11" (storage and sampling unit) at the base of the regenerator 5', and the second catalyst is introduced at 13' upstream of the reactors.

The catalyst samples withdrawn for analysis vary in the course of the process of replacing the second catalyst— downstream of the reactors 1', at 11'(sampling units), at the start of withdrawal;

then, downstream of the reactors 1', at 11', and downstream of the regenerator 5'; and finally, on completion of the operation, downstream of the regenerator 5' (e.g. at 11") alone.

The sampling frequency varies, depending on the phases, from every four hours before the replacing operation to every hour just before and during the replacing operation.

At the start of the process, the first catalyst, of a bulk density d' of about 0.57 g/cm³, is removed downstream of the regenerator at a rate of about 0.452 ton/hour and the second catalyst, of a greater density $d_2$ (0.65 g/cm³), is simultaneously introduced upstream of the two reactors 1' at a rate of about 0.515 ton/hour. The production of the unit is neither interrupted nor altered, the parameters of hourly space rate of the feedstock, temperature and pressure being practically unchanged in relation to those of normal production without catalyst replacement.

At the same time, samples are taken regularly and their density is determined in a manner known per se.

The bulk densities measured at different sampling points as a function of time are presented in Table 1 which follows. Replacement of the catalyst is begun on Day 1 at 8 a.m. and ended on Day 4 at 11 a.m.

TABLE 1

| Sampling day and hour | | 1st Reactor outlet | 2nd Reactor outlet | Regenerator outlet |
|---|---|---|---|---|
| | | Bulk density of samples (g/cm$^3$) | | |
| Day 1 | 8 am | 0.578 | 0.578 | |
| | 10 am | 0.578 | 0.579 | |
| | 2 pm | 0.5745 | 0.580 | |
| | 6 pm | 0.573 | 0.577 | |
| | 10 pm | 0.571 | 0.5765 | |
| Day 2 | 2 am | 0.5685 | 0.5785 | |
| | 6 am | 0.573 | 0.577 | |
| | 10 am | 0.572 | 0.577 | |
| | 2 pm | 0.569 | 0.576 | |
| | 6 pm | 0.568 | 0.576 | |
| | 10 pm | 0.568 | 0.577 | |
| Day 3 | 2 am | 0.568 | 0.577 | |
| | 6 am | 0.579 | 0.574 | |
| | 10 am | 0.617 | 0.613 | |
| | 11 am | 0.620 | 0.645 | |
| | 12 noon | 0.643 | 0.658 | 0.568 |
| | 1 pm | 0.645 | 0.659 | 0.567 |
| | 2 pm | 0.646 | 0.660 | 0.567 |
| | 3 pm | 0.655 | 0.660 | |
| | 4 pm | 0.655 | 0.662 | |
| | 5 pm | 0.654 | 0.665 | |
| | 6 pm | 0.657 | 0.666 | |
| | 7 pm | 0.655 | 0.666 | |
| | 8 pm | 0.657 | 0.666 | |
| | 9 pm | 0.657 | 0.665 | 0.573 |
| | 10 pm | 0.656 | 0.666 | 0.582 |
| | 11 pm | 0.660 | | 0.587 |
| Day 4 | 12 midn | | | 0.608 |
| | 1 am | | | 0.621 |
| | 2 am | | | 0.628 |
| | 3 am | | | 0.630 |
| | 4 am | | | 0.635 |
| | 5 am | | | 0.638 |
| | 6 am | | | 0.645 |
| | 7 am | | | 0.645 |
| | 8 am | | | 0.652 |
| | 9 am | | | 0.653 |
| | 10 am | | | 0.655 |
| | 11 am | 0.661 | 0.670 | 0.652 |

On Day 4, at 11 p.m., the withdrawing of catalyst, the adding of new catalyst and the taking of samples for analysis are stopped simultaneously.

The operation lasted 4 days and 11 hours without any stoppage of production.

Without the means provided by the invention, the downtime would have been nine days, taking into account the procedures for shutdown, discharge and loading and for the control of the conditions of temperature and flow rate, in the case of the exemplified catalytic reforming unit.

Using the process of with the invention, less than 2 percent of the first catalyst remains in the replacement unit and 104 percent of the second catalyst has been introduced.

Without the means of the invention, 123 percent of second catalyst would normally be added to make certain that the catalyst has been completely replaced.

Obviously the same operation can be performed when the bulk density of the second catalyst is less than the bulk density of the first catalyst, that is, the catalyst being replaced, and the procedure to be followed is the same in every respect.

EXAMPLE 2

In a regenerative catalytic reforming unit on the pilot scale, the old catalyst present in the unit is replaced by a new lot of the same catalyst. This replacement is necessary despite the continuous regeneration of the catalyst since a decline in product quality (and particularly in octane number) has been observed even though the reaction temperature was raised repeatedly.

The bulk density of the first catalyst is slightly higher than that of the new lot replacing it, because of the gradual attrition which the calcined catalyst undergoes in this type of process. However, in this case the attrition has not resulted in such degradation of the catalyst that the bulk density of the new lot of catalyst would be sufficiently high for the end of the replacing operation to be established with precision.

The procedure for replacing the first catalyst in normal production makes use of a third substance in measuring the bulk density.

The characteristics of the old and new catalysts and of the third solid substance (which is alumina) are given in Table 2 below.

TABLE 2

| | Old catalyst | Third substance | New catalyst |
|---|---|---|---|
| Bulk density (g/cm$^3$) | 0.68 | 0.75 | 0.65 |
| Particle size (mm) | 1.7 | 2 | 2 |

At the start of the catalyst replacement procedure, there is introduced into the circuit, upstream of the reactor and downstream of the regenerator, 0.5 kg of commercial alumina whose characteristics essential to the invention are given in Table 2. This alumina is of substantially the same particle size as the catalyst used.

The method employed to measure the bulk density is the same as that used in Example 1.

In this example, the precision of the measurement of the bulk density, d=0.65 g/cm$^3$, is ±0.004.

The third substance utilized in this example is alumina. It might also be another catalytic reforming catalyst of equivalent particle size and of a bulk density exceeding by 1 percent that of the catalyst to be replaced, or another lot of the same catalyst, or even another catalyst of the same bulk density.

EXAMPLE 3

In a hydrotreating unit for vacuum-distillation residues (a process of the HYVAHL type, Technical Symposium Aostra, December 1986), a regular daily makeup of fresh catalyst of about 5 tons/day, or 0.7 percent of all of the catalyst in the reactor, is required. This makeup permits the activity of the reactor to be maintained at the desired level.

The bulk density of the old catalyst in normal production is 0.78 g/cm$^3$. The fresh makeup catalyst has a bulk density of 0.6 g/cm$^3$. The new catalyst with which the old one is to be replaced has a bulk density of 0.55 g/cm$^3$.

At the start of the continuous second-catalyst loading operation, the daily makeup is suspended.

The second catalyst is fed into the circuit upstream of the reactor at a rate of 1,200 tons/hour.

The characteristics of the catalysts at their various stages are given in Table 3 which follows.

TABLE 3

|  | Catalyst 1 | | Catalyst 2 | | |
| --- | --- | --- | --- | --- | --- |
|  | New | At equilibrium | New | At end of replacing operation (reactor outlet) | At equilibrium (reactor outlet) |
| Bulk density (g/cm³) | 0.6 | 0.78 | 0.55 | 0.62 | 0.80 |
| Metals | Ni,Mo | Ni,Mo,V,Cu | Ni.Mo | Ni,Mo,V,Cu | Ni,Mo,V,Cu |

The process of the invention thus offers substantial advantages. It does not require the shutdown of the hydrotreating unit in which it is employed and hardly disturbs its operation. Moreover, it permits the reactor or reactors of that unit to be filled with exactly the desired quantity of catalyst. Finally, it can be used with existing units, and placing it into service requires only simple, low-cost means.

Having described in detail preferred embodiments of the present invention, it is to be understood that the invention defined by the appended claims is not to be limited by particular details set forth in the above description as many apparent variations thereof are possible without departing from the spirit or scope of the present invention.

What is claimed is:

1. A process for continuously replacing a first catalyst of solid particles circulating as a moving bed with particles of a second catalyst in a hydrocarbon treating unit having at least one processing reactor and treatment occurring in the unit, without the necessity of interrupting treatment occurring in such unit, said process comprising withdrawing the first catalyst downstream of each reactor relative to the direction of catalyst circulation;

injecting simultaneously the second catalyst upstream of each reactor at essentially the same volume flow rate as the rate of withdrawal of the first catalyst, with said second catalyst particles having an effectively measurable difference in bulk density from that of the first catalyst;

measuring bulk density continuously or at effective intervals to sense the bulk density of the catalyst withdrawn downstream of each reactor sufficiently to detect the occurrence of a change in bulk density, and interrupting the withdrawal of the first catalyst and the injection of the second catalyst when the bulk density of the withdrawn catalyst has been sensed to be different from that of the first catalyst and becomes equal to that of the second catalyst.

2. A process for continuously replacing a first catalyst of solid particles circulating as a moving bed with particles of a second catalyst in a hydrocarbon treating unit having at least one processing reactor, without the necessity of interrupting treatment occurring in such unit, said process comprising withdrawing solid particles, initially composed of the first catalyst, downstream of each reactor relative to the direction of catalyst circulation;

injecting simultaneously the second catalyst upstream of each reactor at essentially the same volume flow rate as the rate of withdrawal of the first catalyst, with said injecting including injecting a quantity of particles of a third solid substance prior to the injection of the second catalyst, said third substance having a bulk density sufficiently sensibly different from that of the first and second catalysts and said injecting of said third substance being in an amount such that the third substance effectively serves as a marker between the first and second catalysts;

measuring bulk density continuously or at effective intervals to sense bulk density of the solid particles withdrawn downstream of each reactor sufficiently to detect the occurrence of a change in bulk density, and interrupting the withdrawal of the solid particles and the injection of the second catalyst when the bulk density of the withdrawn solid particles has been sensed to be different from that of the first catalyst and becomes equal to that of the marker.

3. The process as defined in claim 2, wherein the bulk density of at least one of the second catalyst and of the third substance differs from that of the first catalyst by more than 1 percent.

4. The process as defined in claim 2, wherein the bulk density of at least one of the second catalyst and of the third substance differs from that of the first catalyst by from about 2.5 to 25 percent.

5. The process as defined in claim 1 applied to a hydrocarbon treating unit having several reactors, which process comprises simultaneously replacing the first catalyst in such reactors in a synchronized manner with a second catalyst, and comparing the bulk densities of the catalyst particles withdrawn simultaneously downstream of each of the reactors and regulating the second-catalyst feed rate to each of these reactors and the withdrawal rate from each of these reactors so as to maintain substantially equal measured densities.

6. The process as defined in claim 2, wherein the first and second catalysts have substantially the same bulk density, and wherein the volume of the third solid substance injected represents approximately from 1 to 2 percent by weight of that of the first catalyst.

7. The process as defined in claim 1, wherein variations with time of the bulk density of the material withdrawn from the reactor are represented graphically.

8. The process defined in claim 1, wherein the first and second catalysts have sensibly different densities such that the second is inherently marked as different from the first with respect to their respective bulk densities.

9. The process as defined in claim 1, wherein said treatment in the hydrocarbon treating unit is chosen from the group consisting of reforming, cracking, isomerization and hydrotreatment of vacuum distillation residues.

10. A process for continuously replacing a first catalyst of solid particles circulating as a moving bed with particles of a second catalyst in a hydrocarbon treating unit having at least one processing reactor and treatment occurring in the unit, without interrupting the treatment occurring in such unit, said process comprising withdrawing the first catalyst downstream of each reactor relative to the direction of catalyst circulation;

injecting simultaneously the second catalyst upstream of each reactor at essentially the same volume flow rate as the rate of withdrawal of the first catalyst, with said second catalyst particles having a bulk density sensibly different from that of the first catalyst;

measuring continuously or at effective intervals the bulk density of the catalyst withdrawn downstream of each reactor sufficiently to detect such sensible change in bulk density, and interrupting the withdrawal of the first catalyst and the injection of the second catalyst when the measured bulk density of the withdrawn catalyst after having been measured as different from that of the second catalyst becomes equal to that of the second catalyst.

11. A process for continuously replacing a first catalyst of solid particles circulating as a moving bed with particles of a second catalyst in a hydrocarbon treating unit having at least one processing reactor and treatment occurring in the unit, without interrupting the treatment occurring in such unit, said process comprising withdrawing solid particles, initially composed of the first catalyst, downstream of each reactor relative to the direction of catalyst circulation;

injecting simultaneously the second catalyst upstream of each reactor at essentially the same volume flow rate as the rate of withdrawal of the first catalyst, with said injecting including injecting a quantity of particles of a third solid substance prior to the injection of the second catalyst, said third substance having a bulk density sufficiently sensibly different from that of the first and second catalysts and said injecting of said third substance being in an amount such that the third substance effectively serves as a marker between the first and second catalysts;

measuring bulk density continuously or at effective intervals to sense bulk density of the solid particles withdrawn downstream of each reactor sufficiently to detect the occurrence of a change in bulk density, and interrupting the withdrawal of the solid particles and the injection of the second catalyst when the bulk density of the withdrawn solid particles has been sensed to be different from that of the first catalyst and becomes equal to that of the marker.

12. The process as defined in claim 10, wherein the bulk density of at least one of the second catalyst and of the third substance differs from that of the first catalyst by more than 1 percent.

13. The process as defined in claim 10 applied to a hydrocarbon treating unit having several reactors, which process comprises simultaneously replacing the first catalyst in such reactors in a synchronized manner with a second catalyst, and comparing the bulk densities of the catalyst particles withdrawn simultaneously downstream of each of the reactors and regulating the second-catalyst feed rate to each of these reactors and the withdrawal rate from each of these reactors so as to maintain substantially equal measured densities.

14. The process as defined in claim 11, wherein the first and second catalysts have substantially the same bulk density, and wherein the volume of the third solid substance injected represents approximately from 1 to 2 percent by weight of that of the first catalyst.

* * * * *